United States Patent [19]

Takatori et al.

[11] Patent Number: 5,581,585
[45] Date of Patent: Dec. 3, 1996

[54] PHASE-LOCKED LOOP TIMING RECOVERY CIRCUIT

[75] Inventors: Hiroshi Takatori; Daniel L. Ray, both of Sacramento; Kenneth G. Buttle, Orangevale; James W. Everitt, Grass Valley, all of Calif.

[73] Assignee: Level One Communications, Inc., Sacramento, Calif.

[21] Appl. No.: 327,184

[22] Filed: Oct. 21, 1994

[51] Int. Cl.$^6$ ................... H03H 7/30; H04L 7/00; H03D 3/24
[52] U.S. Cl. .................. 375/376; 375/230; 375/232; 375/233; 375/355
[58] Field of Search ......................... 375/355, 233, 375/232, 229, 230, 235, 327, 328, 293, 294, 346, 348, 350; 331/376, 1 A; 455/255, 257–260; 364/724.19, 724.2; 333/18, 28 R; 327/141, 155, 156, 159, 162, 163; 370/100.1

[56] References Cited

U.S. PATENT DOCUMENTS

| | | | |
|---|---|---|---|
| 3,798,576 | 3/1974 | Torpie et al. | 333/18 |
| 3,931,585 | 1/1976 | Barker et al. | 331/1 A |
| 3,962,637 | 6/1976 | Motley et al. | 375/355 |
| 4,071,827 | 1/1978 | Koike et al. | 375/355 |
| 4,129,748 | 12/1978 | Saylor | 178/69.1 |
| 4,303,837 | 12/1981 | Ansaldi et al. | 307/262 |
| 4,456,890 | 6/1984 | Carickhoff | 331/1 A |
| 4,490,688 | 12/1984 | Borras et al. | 331/1 A |
| 4,494,242 | 1/1985 | Ehrenbard et al. | 375/371 |
| 4,520,489 | 5/1985 | Hogge, Jr. | 375/233 |
| 4,583,234 | 4/1986 | Ramadan | 375/229 |
| 4,677,647 | 6/1987 | Aoyagi | 375/232 |
| 4,694,259 | 9/1987 | Carickhoff et al. | 331/1 A |
| 4,791,386 | 12/1988 | Shiga | 331/1 A |
| 4,805,191 | 2/1989 | Burch et al. | 375/355 |
| 4,815,103 | 3/1989 | Cupo et al. | 375/355 |
| 4,862,485 | 8/1989 | Guinea et al. | 375/376 |
| 4,896,334 | 1/1990 | Sayar | 375/293 |
| 4,972,442 | 11/1990 | Steierman | 375/357 |
| 4,975,660 | 12/1990 | Svenson | 331/1 A |
| 5,018,166 | 5/1991 | Tjahjadi et al. | 375/355 |
| 5,048,060 | 9/1991 | Arai et al. | 375/355 |
| 5,059,924 | 10/1991 | JenningsCheck | 331/1 A |
| 5,068,628 | 11/1991 | Ghoshal | 331/1 A |
| 5,119,401 | 6/1992 | Tsujimoto | 375/233 |
| 5,159,291 | 10/1992 | Ghoshal | 331/1 A |
| 5,181,228 | 10/1993 | Takatori | 375/350 |
| 5,214,671 | 5/1993 | Nakai | 375/232 |
| 5,297,165 | 3/1994 | Ueda et al. | 375/232 |
| 5,325,400 | 6/1994 | Co et al. | 375/296 |
| 5,353,312 | 10/1994 | Cupo et al. | 375/232 |
| 5,388,127 | 2/1995 | Scarpa | 375/376 |

OTHER PUBLICATIONS

Gardner, Floyd M., Phaselock Techniques, 2nd Edition (John Wiley & Sons).
Best, Roland E., Phase—Locked Loops: Theory, Design, & Applications, "Theory of the Digital PLL", (McGraw Hill 1984).

Primary Examiner—Wellington Chin
Assistant Examiner—Huong Luu
Attorney, Agent, or Firm—Merchant, Gould, Smith, Edell, Welter & Schmidt, P.A.

[57] ABSTRACT

A timing recovery apparatus for recovering the timing from sparse timing information in multi-level or partial response codes. The timing recovery apparatus includes a switch for sampling an incoming line code signal according to a selectable sample rate, a feed forward equalizer for filtering the sampled signal, a decision feedback equalizer for cancelling intersymbol interference in the filtered signal and for recovering the timing in the sampled signal. The timing recovery circuit creates a phase correction signal in response to a signal received from the feed forward equalizer and thereby control the sample rate of the sample switch so that the signal-to-noise ratio at the node before the decision is maximized. The voltage controlled crystal oscillator may be controlled within a certain frequency range by using a second phase detector which compares the phase of the signal controlling the sampling of the incoming line code with a reference clock.

15 Claims, 7 Drawing Sheets

PHASE-LOCKED LOOP TIMING RECOVERY CIRCUIT

BACKGROUND OF THE INVENTION

1. Field of the Invention

This invention relates to a timing recovery circuit, and more particularly, to a phase lock loop circuit for recovering the timing from sparse timing information in multi-level or partial response codes.

2. Description of Related Art

Digital data transmission has become increasingly important and accordingly, the need to provide more reliable digital data transmission continues to propel the search for superior systems for recovering timing from a received line code. In order to utilize the bandwidth of the channel effectively, many digital transmission systems have begun to use band efficient multi-level line codes, such as 2B1Q (two-bit coded into one quat symbol) and partial response codes. Although multi-level line codes improve system performance, these line codes make the timing recovery and the pulse shaping more difficult because of the non-self timed characteristics of the line code itself.

The prior art traditionally used analog signal processing of the incoming data signal to derive a timing signal. However, most digital receivers use digital processing techniques to recover the digital information which is modulated on the incoming pulse train. Consequently, the received signal is sampled at discrete time intervals and converted to digital amplitude magnitudes. Any additional processing is accomplished using digital circuitry. To minimize cost and complexity, the incoming signal is usually sampled at the lowest possible rate, i.e., the baud rate. However, sampling at the baud rate creates aliasing distortion when the analog signal waveform is reconstructed. Therefore, analog timing recovery techniques cannot generally be used in digital receivers which operate at the baud rate.

One prior art technique for overcoming this problem is taught by Kurt H. Mueller and Markus Muller in an article entitled "Timing Recovery in Digital Synchronous Data Receivers," IEEE TRANSACTIONS ON COMMUNICATIONS, Volume COM-20, May 1976, pages 516–530, herein incorporated by reference. In this article, a preselected timing function is used to describe the optimal sampling instant. The coefficient values of this timing function are then estimated from the arriving signal samples. However, since timing jitter depends on the actual pulse sequence transmitted as well as the impulse response, the timing function estimates have a relatively high variance. Further, if the channel response is heavily distorted by the bridged taps, this technique cannot be used.

U.S. Pat. No. 5,020,078 to Crespo issued May 28, 1991, herein incorporated by reference, provides a technique for recovering the transmitted signal from the received signal by using a decision feedback equalizer to estimate and then remove the intersymbol interference. A second decision feedback equalizer is used to estimate the timing of the sampling pulse. An optimum timing phase is derived by driving the sampling clock with a phase adjustment signal optimizing the amplitude of the sampling pulse. However, the decision feedback equalizer may be subjected to precursor intersymbol interference which cannot be cancelled.

There is a need, therefore, for a simple device for recovering timing from multi-level codes transmitted over heavily distorted channels.

SUMMARY OF THE INVENTION

To overcome the limitations in the prior art described above, and to overcome other limitations that will become apparent upon reading and understanding the present specification, the present invention discloses a timing recovery device which includes means for sampling an incoming line code signal according to a selectable sample rate, feed forward equalizing means for filtering the sampled signal, and a decision feedback equalizer unit for cancelling intersymbol interference in the filtered signal and for recovering the timing in the sampled signal.

The timing recovery circuit creates a phase correction signal in response to a signal received from the feed forward equalizer and thereby controls the sample rate of the sample means.

The timing recovery circuit is basically for the base band digital transmission but it is also effective for the modulated system as well once the signal is demodulated. The timing recovery circuit also extracts timing information from the baud rate signal, so the signal processing in a transceiver can be simplified.

The present invention solves the above-described problems by providing a phase locked loop timing recovery circuit which adjusts the rate that the original line code signal is sampled so that the signal-to-noise ratio at the node before the decision feedback equalizer is maximized.

A system in accordance with the principles of the present invention comprises a transversal filter of N taps.

One aspect of the present invention is that the sample rate of the incoming signal is adjusted in response to a comparison of a threshold level to the coefficient of the (N−1)th tap.

Another aspect of the present invention is that the threshold level may be determined automatically.

Yet another aspect of the present invention is that the coefficient factor for the N−1 tap may be automatically calculated from the maximized signal-to-noise ratio at the node before the decision feedback equalizer unit.

Another aspect of the present invention is that the voltage controlled crystal oscillator is controlled within a certain frequency range by using a second phase detector which compares a reference clock with the phase of the control signal for the first sampling device.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there is illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the preferred embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides a phase lock loop circuit for recovering the timing from sparse timing information in multi-level or partial response codes.

Figure 1:
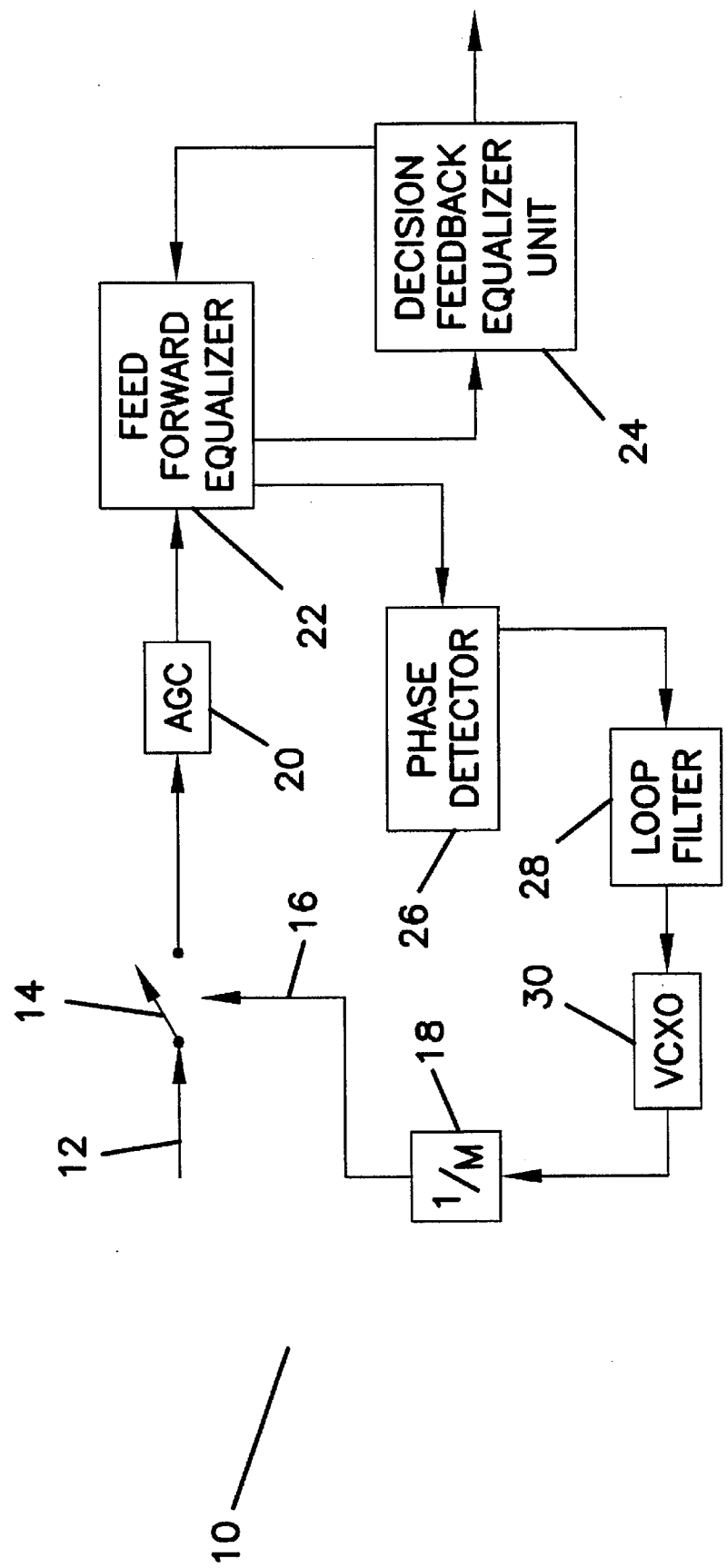
FIG. 1 is a general block diagram of the timing recovery circuit in accordance with the invention.

FIG. 1 show a general illustrative digital data system 10 in which applicants' inventive timing recovery technique is embodied. Information is transmitted over a telecommunications network. Such data may include high-speed data sent over the telecommunications network in a full-duplex manner at a predetermined pulse or baud-rate. In order to utilize the band width of the channel effectively, many digital transmission systems use band efficient multi-level line codes, such as 2B1Q (two-bit coded into one quat symbol) and partial response codes. In a sampled-data system, the accurate reconstruction of such high-speed, sparse timing signals sent over relatively long lengths of a twisted-pair channel is a formidable task. Noise and linear distortion introduced over the transmission media caused received signals to be significantly different from those that are transmitted.

Furthermore, phase variations inevitably occur between the clock or timing signals respectively utilized in the telecommunications network. The variations can affect the ability of terminals to consistently sample received signals. In turn, the ability of a terminal to accurately extract information from distorted signals received from a lossy channel can be thereby deleteriously affected.

By way of example, such data samples are assumed herein to be received over line 12 of FIG. 1. The foregoing clearly illustrates the advantage and importance of being able to reliably recover clock or timing signals.

The input signal received over line 12 is sampled according to a clock signal by switch 14. The signal 16 controlling the sample rate is divided down by the divider 18 to the appropriate speed such as the symbol rate. After being adjusted by automatic gain control (AGC) 20, the signal is fed to the feed forward equalizer (FFE) 22. The feed forward equalizer 22 adapts to the line response so that the node immediately prior to the decision feedback equalizer unit (DFE) 24 sees no precursor intersymbol interference (ISI) which cannot be cancelled by the DFE.

The feed forward equalizer 22 also provides a coefficient value of the (N−1)th tap to the phase detector 26. This value is compared to a reference signal to generate an output that is a measure of the phase difference. The loop filter 28 then generates a voltage for controlling the voltage controlled crystal oscillator 30 in response to the output of the phase detector 26.

Figure 2:
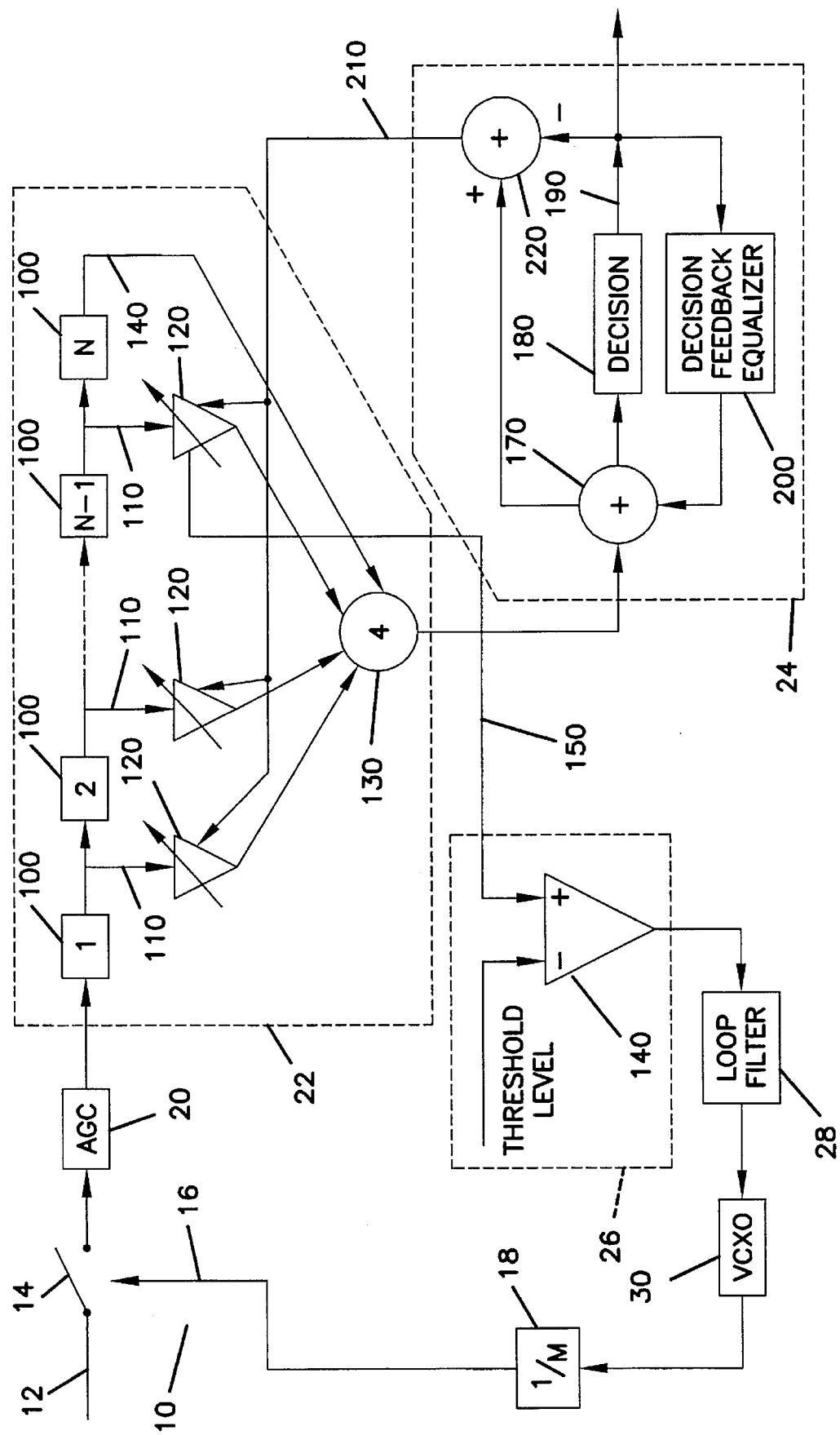
FIG. 2 is a detailed block diagram of the timing recovery circuit in accordance with the invention.

Now referring to FIG. 2, the feed forward equalizer 22 is a N-tap transversal filter, which is conceptually a delay line 100 tapped at predefined intervals. Each tap 110 is connected through a variable gain 120 to a summing bus 130. The final tap 140 has a fixed value of unity (i.e., the coefficient value of Nth tap equals 1), and is not adaptive. The sampling speed at the input is assumed to be the symbol rate. In other words, one value of the input signal is sampled per symbol period and is fed to the feed forward equalizer 22. Each tap 110 sends an adjusted signal to the summing node wherein the post-cursor intersymbol interference is cancelled by the decision feedback equalizer unit 24.

The phase information is derived in the phase detector 26. A threshold level signal 140 is subtracted from the coefficient value 150 of the (N−1) tap of feed forward equalizer 22 and fed to the loop filter 28. As stated above, the voltage at the output of loop filter 28 controls the frequency of the voltage control crystal oscillator 30. According to FIG. 2, the value of the threshold signal 140 is a pre-selected value. This threshold level signal 140 is chosen so that the node before the decision 160 has the maximum signal-to-noise ratio (SNR) over the worst case line condition and the known noise condition.

As illustrated in FIG. 2, the decision feedback equalizer unit 24 consists of an adder 170 having an output to a decision block or threshold detector 180. The decision block 180 generates the recovered timing signal 190. In turn, the output 190 of the decision block 180 is fed back into a decision feedback equalizer circuit 200 which estimates the post cursor intersymbol interference. Thus, the decision feedback equalizer 200 provides feedback to cancel any intersymbol interference in the signal received from the feed forward equalizer.

In addition, an error signal 210 is generated by a subtractor circuit 220. The subtractor circuit subtracts the output of the decision circuit 190 from the output of the adder 160. The error signal 210 derived from the decision feedback equalizer unit 24 is used to drive the coefficient values 120 of the first N−1 taps 110 in the tranversal filter so as to eliminate distortions.

The error signal 210 adaptively adjusts the taps 120 of the transversal filter in accordance with some well-known adaptive algorithm such as the least square (LS) algorithm, the least mean square (LMS) algorithm or the recursive least square (RLS) algorithm. Although the LS and the RLS algorithms are faster than the LMS algorithm, they require more complex hardware to implement and hence the present invention will be described in terms of the LMS algorithm. It is to be understood, however, that any other adaptive algorithm can be used if warranted by the specific application.

In accordance with the LMS algorithm, the initialization of the timing recovery circuit will be described. At the beginning of the link activation, the feed forward equalizer coefficients 120, except for Nth tap 140 which is unity, are set to zero. These coefficients start converging based on the least mean square algorithm. For example:

$h(i+1) = h(i) + u \times error(i) \times data(i-M)$; or $h(i+1) = h(i) + u \times error(i-M) \times data(i)$, (Mth tap case), where $h(i)$ is the feed forward equalizer 22 coefficient at $t = T \times i$, T is the symbol period, u is the small value defining the convergence speed, $error(i)$ is the error at $t = T \times i$, and $data(i)$ is the decision data.

Figure 3:
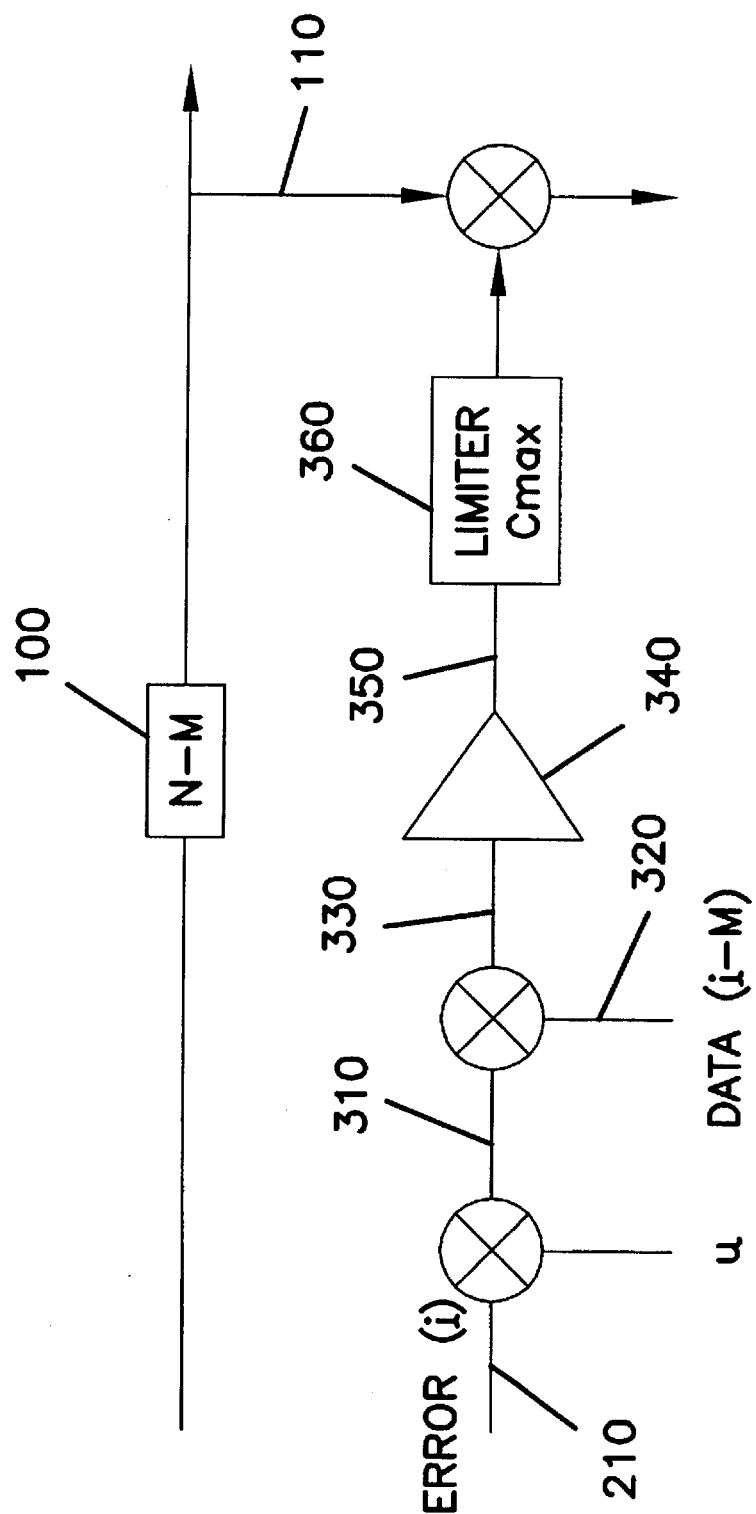
FIG. 3 is a block diagram of the internal circuit of a feed forward equalizer tap circuit in accordance with the invention.

FIG. 3 shows the internal circuit of one feed forward equalizer 22 tap circuit 120 which implements the above equation. The error signal 210 derived from the decision feedback equalizer unit 24 is mixed with u 320. The resulting signal 310 is then mixed with the decision data 320. This resulting signal 330 is then fed to an integrator 340. The output 350 of the integrator 340 is sent to a limiter 360. The limiter 360 ensures that the coefficient does not exceed $C_{max}$. Finally the output from the limiter 360 is mixed with a tapped signal 110.

As the convergence of feed forward equalizer 22 and decision feedback equalizer unit 24 proceed, the feed forward equalizer coefficients 120 adapt to the channel and noise characteristic and converge to values where the addition of the intersymbol interference and the additive noise at the decision node is minimized. However, since the Nth feed forward equalizer tap 140 is fixed to unity value and the other coefficient values 120 are limited to the value $C_{max}$, the feed forward equalizer 22, according to the present invention, maintains a group delay constant, i.e., N symbol periods. Thus, the feed forward equalizer coefficient values 120 are a function of the phase difference between the sampling clock 16 and the transmitted phase of the incoming signal 12.

Figure 4:
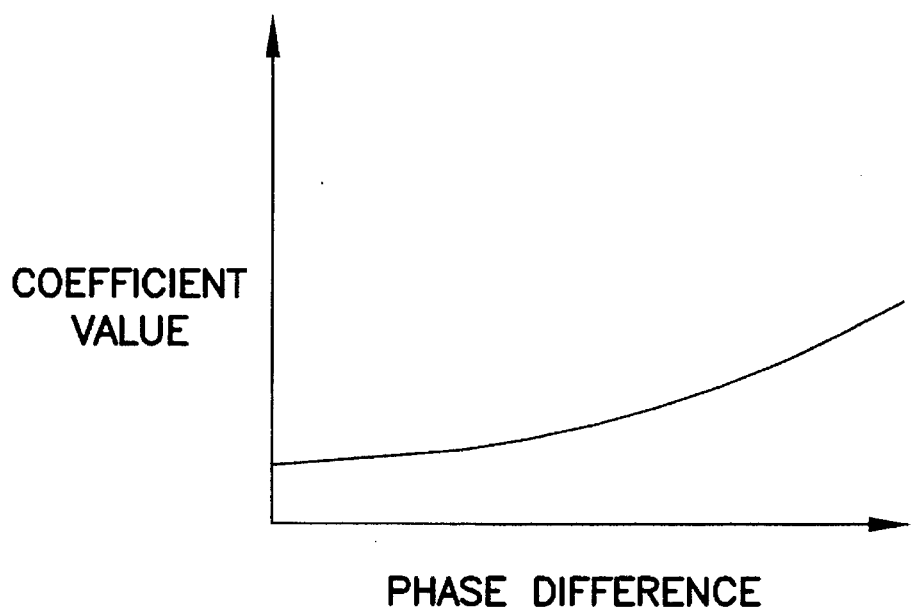
FIG. 4 is a plot of the coefficient values versus phase difference between transmit timing and sampling timing at the receiver in accordance with the invention.

FIG. 4 illustrates the plot of the feed forward equalizer (N−1)th coefficient value vs. phase difference between the transmit timing and sampling timing at the receiver in which the coefficient increases substantially linearly as the phase difference changes.

Figure 5:
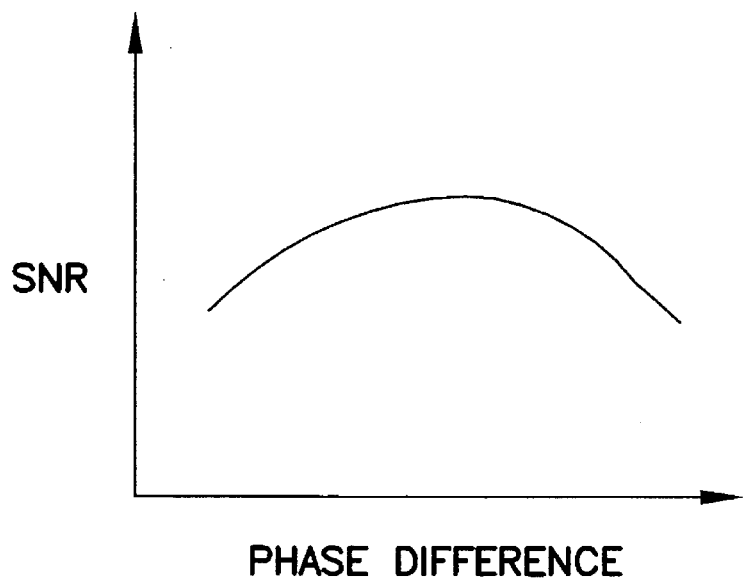
FIG. 5 is a plot of the signal-to-noise ration versus phase difference in accordance with the invention.

FIG. 5 shows the relationship between the signal-to-noise ratio and the phase difference. FIGS. 4 and 5 illustrate that the best sampling timing can be designed by simply setting the threshold level 140 of the phase detector 26 to the appropriate value so that the signal-to-noise ratio is maximized.

The coefficient value and the signal-to-noise ratio plots shown in FIGS. 4 and 5 are specific to the worst case channel and noise environment. However, if the threshold level 140 is selected to get the best performance for the worst case channel, the performance over all other channels that the system has to operate should be better than the worst case.

Figure 6:
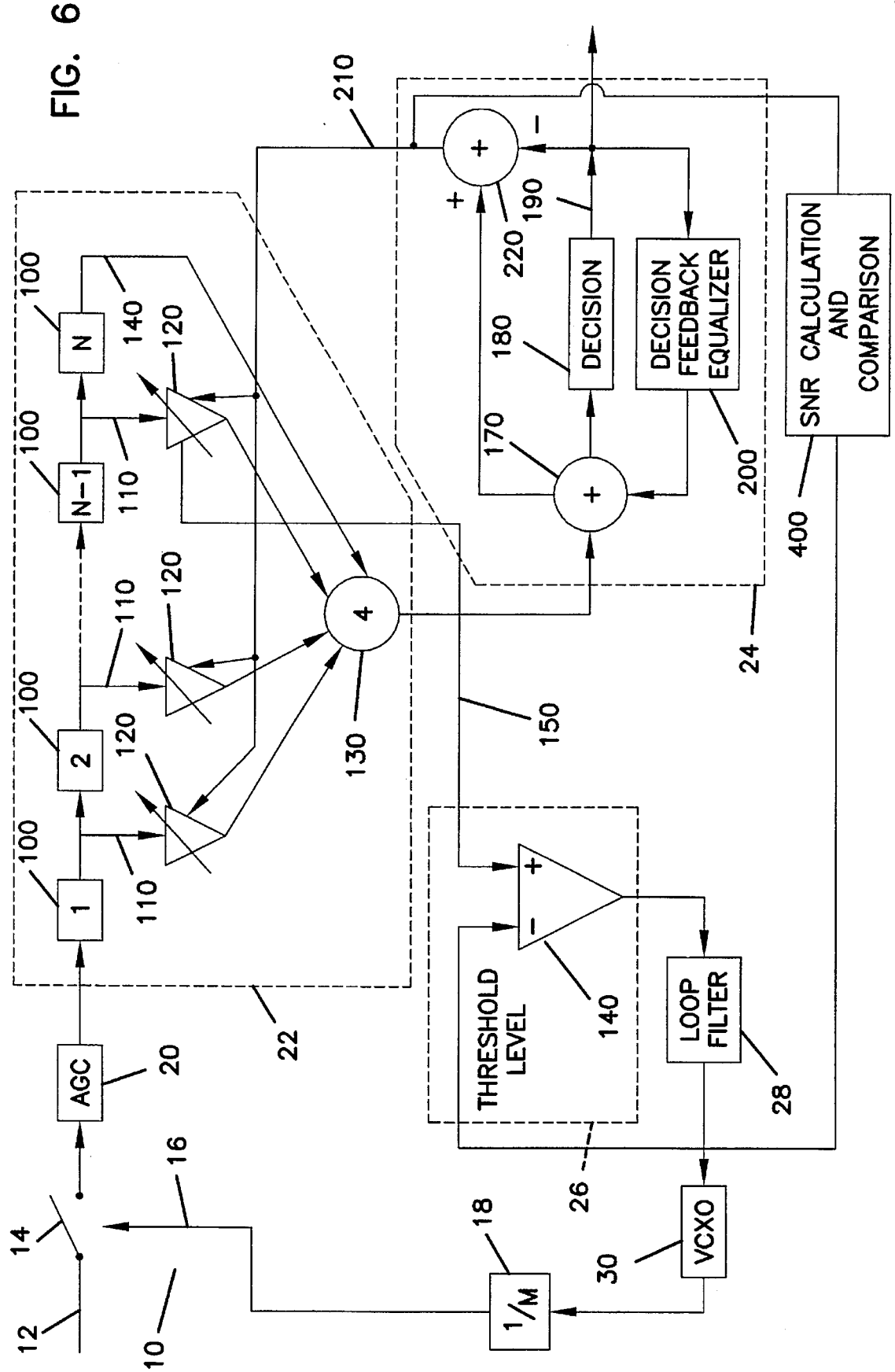
FIG. 6 is a detailed block diagram of the timing recovery circuit having an automatic threshold calculator in accordance with a second embodiment of the invention.

FIG. 6 illustrates a second embodiment according to the present invention. In the second embodiment illustrated in FIG. 6, the threshold level 140 is automatically controlled. Accordingly, the threshold value of the phase detector 26 is generated by the SNR calculator and comparator 400. The threshold level 140 is initially set to the proper value, $C_n$. The signal-to-noise ratio is calculated once and stored in the SNR calculator and comparator 400. The threshold level 140 is then increased by small step by $C_{del}$, creating $C_n+C_{del}$ as the new value. Thereafter, the signal-to-noise ratio level is again calculated. If the newly calculated signal-to-noise ratio is greater that the old signal-to-noise ratio, the threshold level 140 is decreased. By repeating this process, the best sampling phase which leads to the best performance is achieved under any kind of channel and noise characteristics.

Figure 7:
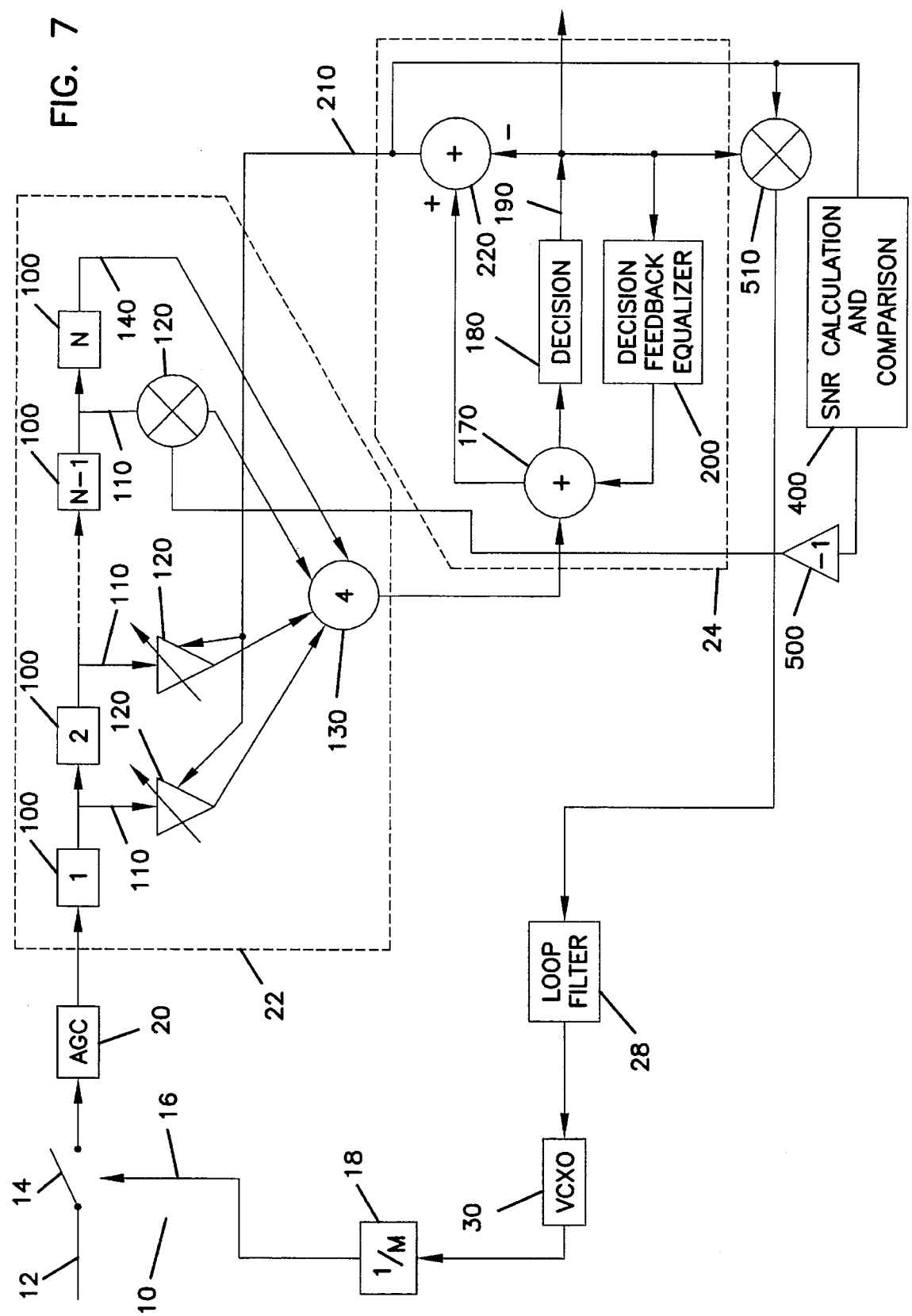
FIG. 7 is a detailed block diagram of the timing recovery circuit having the coefficient for the (N−1)th tap automatically calculated in accordance with a third embodiment of the invention.

FIG. 7 illustrates a third embodiment according to the present invention. The third embodiment illustrated in FIG. 7, depicts a modification in the (N−1)th tap 150. The automatically converged value used for the threshold value in FIG. 6 is now inverted 500 and used for the (N−1)th tap coefficient. In this embodiment of the invention, the phase information is derived from the output signal 190 of the decision feedback equalizer unit 24 and the error signal 210 using mixer 510. The output signal from the mixer 510 feeds the loop filter 28. As stated above, the voltage at the output of loop filter 28 controls the frequency of the VCXO 30. Since the order of the phase-locked loop is reduced from 3rd to 2nd, the loop stability is improved.

Figure 8:
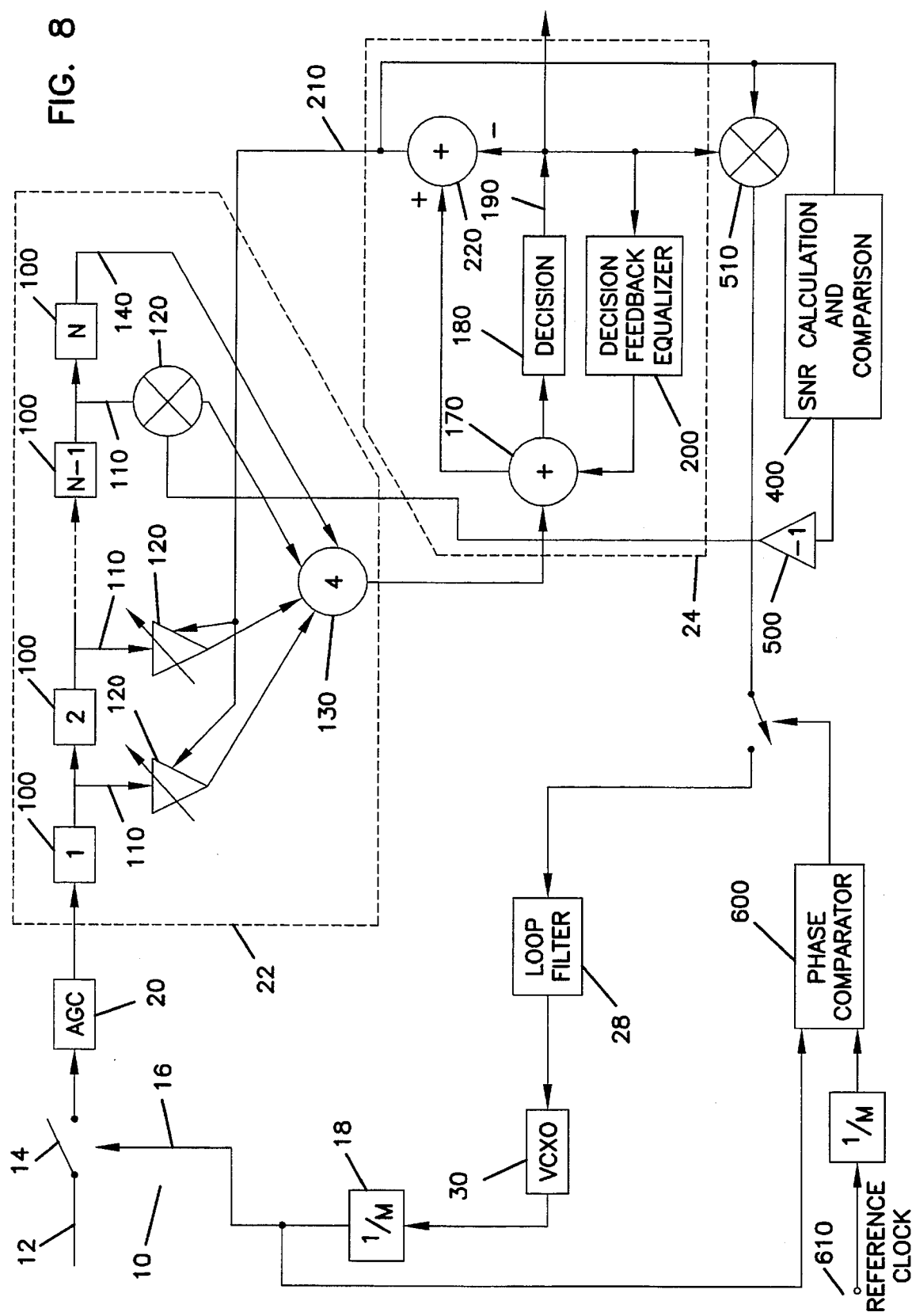
FIG. 8 is a detailed block diagram of the timing recovery circuit having improved phase accuracy in accordance with a fourth embodiment of the invention.

FIG. 8 illustrates a fourth embodiment according to the present invention. The fourth embodiment as illustrated in FIG. 8, depicts a structure which provides more accurate frequency control. Normally, the phase-locked loop structure does not have a wide capture range because of the sparse timing information and heavily distorted channel response. For example, plus and minus 60 to 80 ppm is normally the maximum frequency offset that can be captured. However, a cost effective VCXO 30 which meets 60 to 80 ppm frequency accuracy is rare and very expensive. More typically, the frequency accuracy varies ±200 to 300 ppm due to the manufacturing process.

FIG. 8 illustrates improving the accuracy of the voltage controlled crystal oscillator 30 within a certain frequency range by using a second phase detector 600 which compares the phase of the signal controlling the sampling of the incoming line code 16 with a reference clock 610. The output of the second phase detector 600 drives switch 620 which is installed between the loop filter 28 and mixer 510. After the phase-locked loop converges, the threshold based phase detector 600 is connected. Due to the second phase detector 26, the requirement on the frequency accuracy of VCXO 30 is relaxed. Hence a highly accurate VCXO 30 can be made cost effective.

During the link activation period before the feed forward equalizer 22 and decision feedback equalizer unit 24 become adaptive, the second phase detector 600 is connected to the loop filter 28. After controlling VCXO frequency offset from 200 ppm to 60 ppm, the phase-locked loop uses the threshold basis phase detector 600 and the total phase-locked loop to track the incoming phase. As mentioned above, the second phase detector 600 is referenced to an accurate external clock (±30 to 40 ppm) source 610.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A timing recovery circuit, comprising: sampling means for sampling an incoming line code signal according to a selectable sample rate;

a feed forward equalizer, coupled to the sampling means, comprises a transversal filter for receiving and filtering the sampled incoming line code signal, the transversal filter comprising N taps, each of the N taps providing an output, N−1 multipliers for multiplying each of the outputs of N−1 of the N taps by a respective coefficient factor, each of the N−1 multipliers providing an output, and an adder for adding the respective outputs of the N−1 multipliers and the output of the Nth tap to produce a filtered signal that is adapted to the sampled incoming line code signal;

a decision feedback equalizer, coupled to the feed forward equalizer, for cancelling an intersymbol interference in the filtered signal, for adjusting the filtering in the feed forward equalizer, and for recovering timing information from the filtered signal;

phase determining means, coupled to a multiplier in the feed forward equalizer, the phase determining means receiving a coefficient factor from the multiplier and creating a phase correction signal in response thereto;

sample control means, coupled to the phase determining means and the sampling means, for creating a sample control signal for selecting the sample rate of the sampling means in response to the phase correction signal generated by the phase determining means.

2. The timing recovery apparatus of claim 1, wherein the decision feedback equalizer further comprises decision feedback means for estimating intersymbol interference, accumulating means for receiving the filtered signal of the feed forward equalizer and the estimated intersymbol interference from the decision feedback means, and decision means for receiving the output of the accumulating means and for generating the recovered timing information.

3. The timing recovery apparatus of claim 1, wherein the phase determining means further comprises a comparator for comparing a threshold level to the coefficient factor received from the feed forward equalizer and a loop filter, coupled to the output of the comparator, for generating the phase correction signal in response thereto.

4. The timing recovery apparatus of claim 3, wherein the threshold level is a predetermined constant threshold level.

5. The timing recovery apparatus of claim 3, wherein the threshold level is generated by the decision feedback equalizer.

6. The timing recovery apparatus of claim 1, wherein the sample control means is a voltage controlled crystal oscillator.

7. A timing recovery circuit, comprising:

sampling means for sampling an incoming line code signal according to a selectable sample rate;

a transversal filter means, coupled to the sampling means, for filtering the sampled signal, said transversal filter means having N delay taps, each of the taps providing an output, the transversal filter means further comprising N−1 coefficient means, each coupled to one of N−1 of the N taps, for multiplying the respective output of the N−1 taps by a respective coefficient factor, and an adder for adding the outputs of the N−1 coefficient means to the output of the Nth tap;

decision feedback equalizer means, coupled to the transversal filter means, for estimating intersymbol interference in the output of the transversal filter means and for generating an error signal fed back to the transversal filter means;

accumulating means for receiving the output of the transversal filter means and the estimated intersymbol interference from the decision feedback equalizer means, for accumulating the estimated symbol interference and the output of the transversal filter means, and for generating an output in response thereto;

decision means, coupled to the accumulating means, for receiving the output of the accumulating means and for recovering timing information from the sampled signal;

phase determining means, coupled to the transversal filter means, for comparing a coefficient value for the (N−1)th tap to a threshold level and for generating a phase correction signal in response thereto; and sample control means, coupled to the phase determining means and the sampling means, for creating a sample control signal for selecting the sample rate of the sample means in response to the phase correction signal.

8. The timing recovery apparatus of claim 7, wherein the threshold level is a predetermined constant threshold level.

9. The timing recovery apparatus of claim 7, wherein the threshold level is generated in response to the error signal from the error decision feedback equalizer means.

10. The timing recovery apparatus of claim 7, wherein the sample control means is a voltage controlled crystal oscillator.

11. A timing recovery circuit, comprising:

first sampling means for sampling an incoming line code signal according to a first sample rate;

a feed forward equalizer, coupled to the first sampling means, the feed forward equalizer further comprising a transversal filter means for receiving and filtering the sampled incoming line code signal, the transversal filter means having N taps, each of the N taps providing an output, N−1 coefficient means for multiplying the outputs of N−1 of the N taps by a respective coefficient factor, and an adder for adding the outputs of the N−1 coefficient means and the output of the Nth tap to produce a filtered signal that is adapted to the sampled incoming line code signal;

a decision feedback equalizer, coupled to the feed forward equalizer, for cancelling intersymbol interference in the filtered signal, for recovering timing information from the sampled signal, and for generating an error signal in response thereto for adjusting the filtered signal in the feed forward equalizer;

phase determining means, coupled to the decision feedback equalizer, for creating a phase correction signal in response to the recovered timing information and the error signal; and sample control means, coupled to the phase determining means and the first sampling means, for creating a sample control signal for selecting a new sample rate for the sample means in response to the phase correction signal generated by the phase determining means.

12. The timing recovery apparatus of claim 11, further comprising means, coupled to the feed forward equalizer and the phase determining means, for automatically calculating a threshold level resulting in the highest signal-to-noise ratio at the input of the decision feedback equalizer.

13. The timing recovery apparatus of claim 11, wherein the feed forward equalizer further comprises a transversal filter means having N taps, each of the N taps providing an output, a first coefficient factor control means, coupled to N−2 of the N taps, for modifying a coefficient factor to the N−2 taps in response to the error signal, a second coefficient factor control means, coupled to the (N−1)th tap, for modifying a coefficient factor to the (N−1)th tap in response to the error signal, and an adder for adding the output of the Nth tap to the outputs of the first and second coefficient factor control means.

14. The timing recovery apparatus of claim 11, wherein the phase determining means further comprises a loop filter, automatic threshold calculation means, coupled to the error decision feedback equalizer, for generating a threshold level signal in response to the error signal, and comparator means, coupled to the loop filter and the threshold calculation means, for generating a signal in response to the threshold level signal and the coefficient factor value from the (N−1)th tap.

15. The timing recovery apparatus of claim 11 wherein the phase determining means further comprises:

a multiplier, coupled to the decision feedback equalizer, for generating a pulse train in response to the error signal and the recovered timing signals;

second sampling means, coupled to the multiplier for sampling the pulse train, the second sampling means sampling the incoming signal according to a second selectable sample rate;

a loop filter, coupled to the second sampling means, for providing a voltage output;

a second sample control means, coupled to the loop filter, for creating a sampling control signal for regulating the first sample rate of the first sampling means in response to the voltage output of the loop filter; and phase comparison means, coupled to the output of the second sample control means and to a reference clock, for comparing the phase of the sampling control signal to the phase of the reference clock, the phase comparison means generating a sampling control signal for regulating the second sample rate of the second sampling means in response thereto.

* * * * *

UNITED STATES PATENT AND TRADEMARK OFFICE
CERTIFICATE OF CORRECTION

PATENT NO. : 5,581,585

DATED : December 3, 1996

INVENTOR(S) : Takatori et al.

It is certified that error appears in the above-identified patent and that said Letters Patent is hereby corrected as shown below:

In column 3, line 1, "ration" should be --ratio--.

line 27, "show" should be --shows--.

In column 8, claim 9, line 3, delete "error" after the word 'the'.

claim 14, line 53, delete "error" after the word 'the'.

Signed and Sealed this

Twenty-sixth Day of August, 1997

Attest:

BRUCE LEHMAN

Attesting Officer

Commissioner of Patents and Trademarks